C. H. JAEGER.
PROCESS OF AND APPARATUS FOR RAREFYING AND COMPRESSING AIR AND GASES BY MEANS
OF LIQUID ACCELERATED BY A ROTOR WHEEL.
APPLICATION FILED SEPT. 24, 1910.

1,063,034.

Patented May 27, 1913.

WITNESSES
Alfred R. Anderson.
Cornelius Hoving.

INVENTOR
CARL H. JAEGER

BY
ATTORNEY

UNITED STATES PATENT OFFICE.

CARL HERMANN JAEGER, OF LEIPZIG, GERMANY.

PROCESS OF AND APPARATUS FOR RAREFYING AND COMPRESSING AIR AND GASES BY MEANS OF LIQUID ACCELERATED BY A ROTOR-WHEEL.

1,063,034.  Specification of Letters Patent.  Patented May 27, 1913.

Application filed September 24, 1910. Serial No. 583,670.

*To all whom it may concern:*

Be it known that I, CARL HERMANN JAEGER, a subject of the German Emperor, and residing at Leipzig, Germany, have invented new and useful Improvements in Processes of and Apparatus for Rarefying and Compressing Air and Gases by Means of Liquid Accelerated by a Rotor-Wheel; and I do hereby declare the following to be a full, clear, and exact description of the same.

This present invention has for its object to provide a simple and efficient device or apparatus for rarefying or compressing air and gases by means of accelerated jets of water.

Another object of this invention is to provide an apparatus capable of producing rarefied or compressed air with high useful output.

The accompanying drawings show an example of construction of my improved apparatus.

Figure 1:
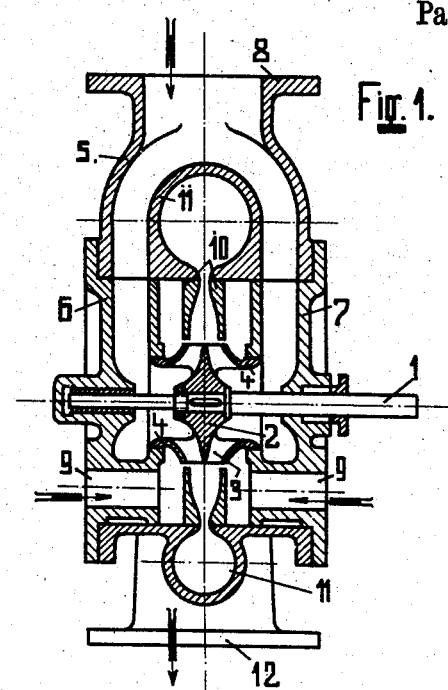
Figure 2:
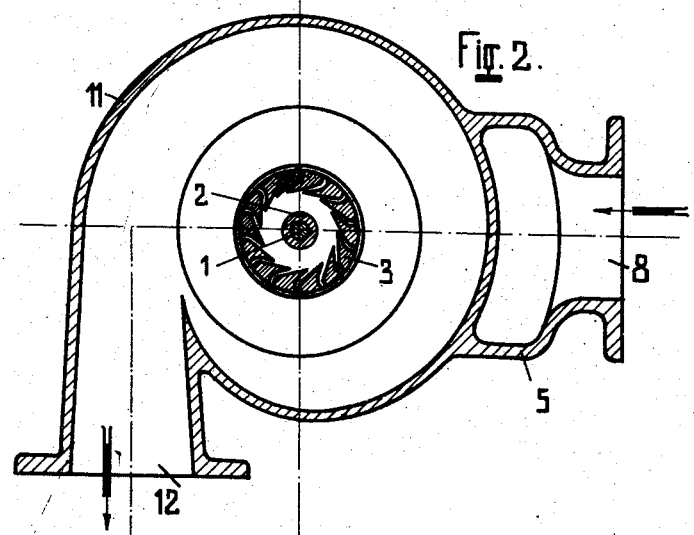

Figure 1 is a longitudinal section and Fig. 2 is a cross-section of the apparatus.

In these drawings, 1 indicates the shaft of the pump, on which is secured the hub 2, carrying blades 3 which partially cover the periphery of the wheel, so that water can only be ejected from separate slots. These blades are closed by opposite side walls 4. The water is admitted at the inner periphery of the wheel from the casing 5, closed laterally by covers 6, 7 and into which water is sucked through a pipe (not shown) connected to the tubular extension 8. Air is sucked through the passages 9. Therefore the air surrounds the outer periphery of the rotor-wheel.

When the rotor-wheel is rapidly rotated, the strips of water ejected from the same place themselves spirally around the wheel and confine between them the air to be compressed and surrounding said rotor-wheel.

The strips of water with the confined air enter the compression chamber, formed of two side-walls 10 and reduced toward the outside to a narrow annular slot. The liquid and compressed air escape together through the annular slot into the collector 11 which is shaped concentrically or eccentrically, and provided with a tubular extension 12 for the connection of a pipe.

In the arrangement of my invention the guide blades or buckets and the like outside the rotor-wheel are omitted and the air is not drawn away by adherence of the jets of liquid but conveyed by and between the latter, whereby a high useful output is obtainable.

Having fully described my invention, what I claim and desire to secure by Letters Patent is:—

In an apparatus for compressing elastic fluids, the combination with a rotary impeller for liquid constructed with transversely extended spaced openings in its periphery, whereby thin strips of liquid may be ejected therefrom, of a compressing chamber surrounding the periphery of said impeller and into which said impeller discharges constructed with an inlet passage for elastic fluid, an annular peripheral discharge passage and side walls which converge gradually from the outlet of the impeller to said discharge passage.

In testimony whereof, I have signed my name to this specification in the presence of two subscribing witnesses.

CARL HERMANN JAEGER.

Witnesses:
RUDOLPH FRICKE,
ALBERT R. MORAWETZ.